Sept. 18, 1956   W. C. RENDALL   2,763,239
DISPOSABLE PAPERBOARD SHIPPING AQUARIUM
Filed April 20, 1953   3 Sheets-Sheet 2

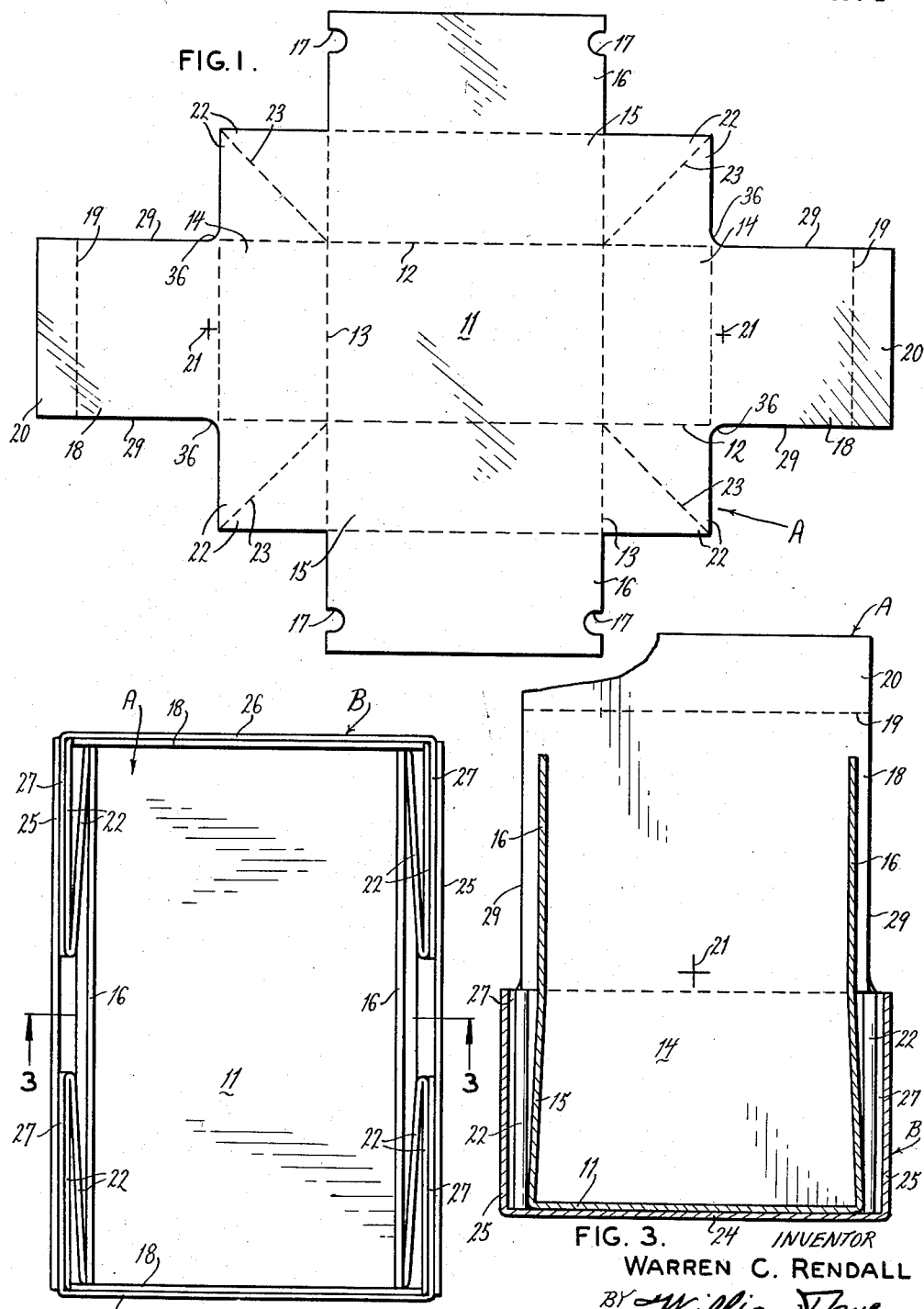

INVENTOR.
WARREN C. RENDALL
BY William T. Nye
ATTORNEY

Sept. 18, 1956            W. C. RENDALL            2,763,239

DISPOSABLE PAPERBOARD SHIPPING AQUARIUM

Filed April 20, 1953            3 Sheets-Sheet 3

INVENTOR.
WARREN C. RENDALL
BY
*William Thye*
ATTORNEY

United States Patent Office 2,763,239
Patented Sept. 18, 1956

2,763,239

DISPOSABLE PAPERBOARD SHIPPING AQUARIUM

Warren C. Rendall, Tampa, Fla., assignor, by mesne assignments, to Crown Zellerbach Corporation, San Francisco, Calif., a corporation of Nevada Application April 20, 1953, Serial No. 349,601

5 Claims. (Cl. 119—5)

This invention relates, in general, to a waterproof container and more specifically to a container having a provision for aerating the contents without removing the cover of the container. The container may be made of solid fibreboard, corrugated fibreboard, or any other suitable material.

Large numbers of live fish and other marine animals, which must remain in water to sustain life are shipped throughout the country each year. In the past, it has been customary to provide transportation in relatively expensive, heavy-duty, cylindrical cans and other metallic receptacles. The rather high cost of this type of container made it necessary to return them to the owner for re-shipment. Furthermore, since in many instances, the marine animals are under shipment or in transient for a considerable period of time, it is necessary to periodically refresh the water in the shipping container by aeration. An inexpensive expendible waterproof container, the contents of which may be aerated without removing the cover, therefrom possesses distinct advantages for the shipment of live marine animals.

One object of this invention is to provide, in a relatively inexpensive container means for readily permitting an aeration device to be inserted into the container so that the water therein may be periodically refreshed during transit.

It is a further object of this invention to provide entry means for an aeration device, said means being readily resealable into a waterproof joint when the aeration device is removed.

A still further object of the invention is to provide access means for an aeration device, the means requiring no further material than already present in the container.

A still further object is to provide, in a waterproof container for carrying live fish and the like, a construction whereby, as the top closure is secured in place, the side walls of the waterproof interior portion of the container are firmly and securely maintained in position within the container.

Another object of the invention is to provide a waterproof container for shipping live marine animals which is adapted to be constructed of inexpensive material, such as fibreboard and the like and which may be discarded after a single trip.

The invention therefore comprises a container with a waterproof insert for containing live marine animals immersed in water and resealable means for inserting an aeration device without removing the cover of the container.

In the accompanying drawings which form a part of this specification, like numerals and symbols refer to like parts wherever they occur.

Fig. 1 is a plan view of a blank of a waterproof insert employing a preferred form of this invention;

Fig. 2 is a top plan view of an erected container shown with a water-proof insert, employing a preferred form of this invention, in position;

Fig. 3 is a side elevation of the container and insert shown in Fig. 2, taken through section 3—3

Figure 4:
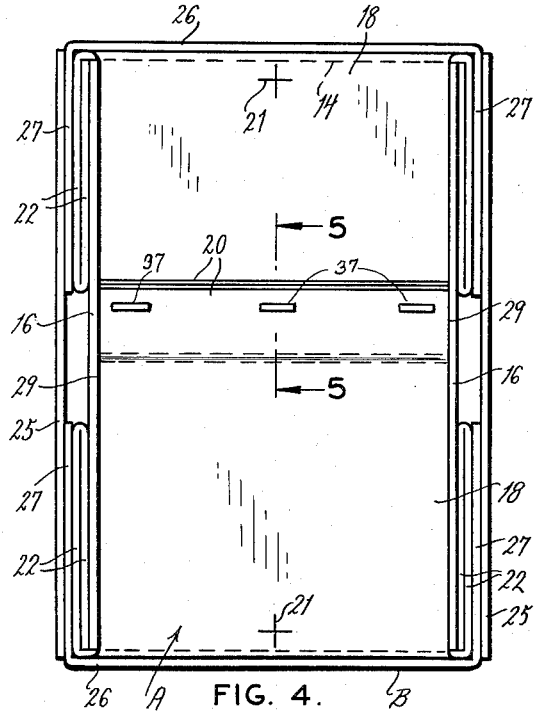
Fig. 4 is a top plan view of the container and insert illustrated in Figs. 2 and 3 with the end flaps of the insert in closed position.

The waterproof insert A, shown in Fig. 1, is provided with a bottom panel 11 which is defined by parallel side scores 12 and parallel end scores 13. End panels 14 are foldably connected to the bottom panel 11 along the end scores 13. In a similar manner side panels 15 are foldably connected to the bottom panel 11 along the side scores 12. The side panels 15 are provided with side cover flaps 16 having semicircular access notches 17. The end panels 14 in turn are provided with foldably connected end cover flaps 18, each having a spaced score 19 which defines a center flap 20. The end cover flaps 18 are provided at central portions of their inner margins with cross-slits 21. The ends of adjacent end panels 14 and side panels 15 are provided with triangularly shaped integral corner panels 22 which are connected together along a common edge defined by a miter score 23. If it is desired to provide further insurance against leakage, the corners between the side cover flaps 16 and the end cover flaps 18 may be provided with rounded fillets as at 36.

The waterproof insert A may be erected by folding the side panels 15 upwardly about the side scores 12 into substantially right angular relation with the bottom panels 11. Next, the end panels 14 are folded upwardly about the end scores 13 into upright relationship with the bottom panel 11. In this position, each adjacent pair of the triangular shaped corner panels 22 will be automatically folded about the miter score 23 into flatwise relation with each other. Each adjacent pair of the corner panels is then folded inwardly into flatwise relation with their adjacent side panels 15.

With the waterproof insert A, in this stage of erection, it is inserted into a previously erected body member B, shown in Fig. 2, of any suitable style. The inner dimensions of the body member B should be such that the partially erected waterproof insert A fits snugly within the interior. The height of the body member B is substantially equal to the height of the end panels 14 and the side panels 15. Any type body member may be used, for instance, the embodiment illustrated in Figs. 2 and 3 is provided with a bottom wall 24 and foldably connected adjacent side walls 25 and end walls 26. The body end flaps 27 which are foldably connected to the ends of the end walls 26 are secured by stitches 28 to the end margin of the adjacent side wall 25. Glue, tape or other means of securing the container may, however, be used.

Figure 5:
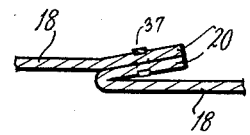
Fig. 5 is a fragmentary view, through section 5—5 of Fig. 4.

After the fluid contents are poured into the waterproof insert in the container, each center flap 20 is folded upwardly about the adjacent spaced score 19 into substantially right angular relation with the adjacent end cover flap 18. The end cover flaps are then folded simultaneously inward until their free end edges, as defined by spaced score 19, are in adjacent contacting relation. In this position the two center flaps 20 are in juxtaposed relation, extending vertically upward. The center flaps 20 are then secured together by any suitable means, for instance, by stitches or staples 37. The secured together flaps 20 are then folded in unison, downwardly to a position flatwise against the adjacent upper face of one of the end cover flaps 18, as shown in Figs. 4 and 5. The side margins 29 of the end cover flaps 18 will be in snug, normal contacting relation with the upper margin of the adjacent side panels 15, thus forcing them firmly outwardly against the adjacent side wall 25 of the body member B. Thus, the insert is firmly and tightly maintained in the outside body member B. Fig. 4 clearly illustrates the waterproof insert A within the body member B with the end cover flaps shown folded into position.

Figure 7:
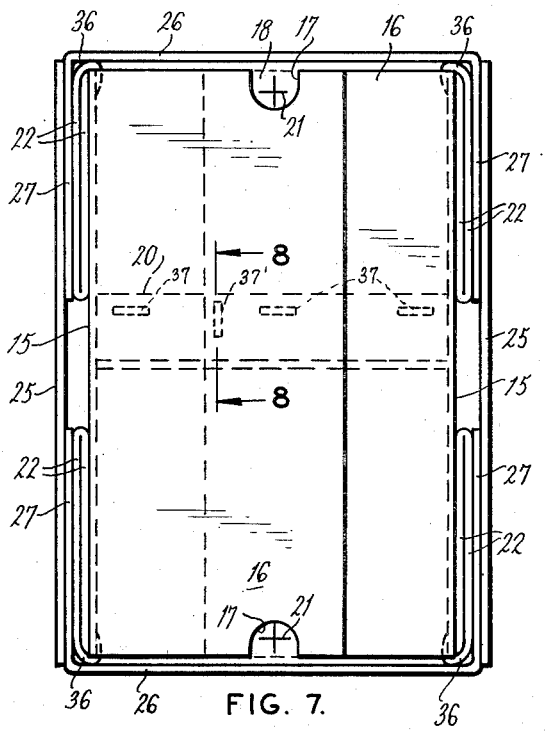
Fig. 7 is a vertical, top plan view of the container and insert illustrated in Figs. 2, 3 and 4 with the side and end cover flaps positioned in closed position.

One of the side cover flaps 16 is then folded inwardly into partially overlapping relation with the previously positioned and secured center flaps 20. The folded side cover flap is then secured, by a staple 37' or any other suitable means, to the center flaps 20. The remaining cover flap 16 is then folded as illustrated in Fig. 7. The resulting construction is substantially leakproof. The access notches 17 on the overlapping portions of the opposing side cover flaps 16 are in registering relation over the subjacent cross-slits 21.

Figure 6:
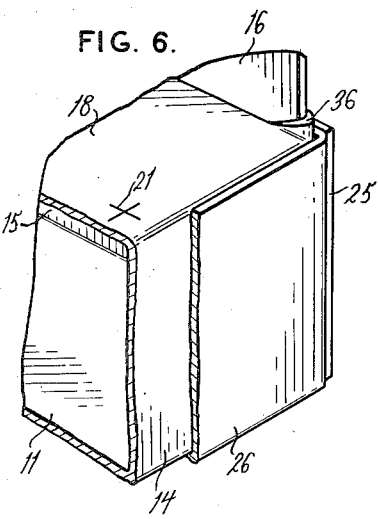
Fig. 6 is a fragmentary perspective view of the corner of a container and insert, with the end cover flaps folded inwardly into closed position.
Figure 8:
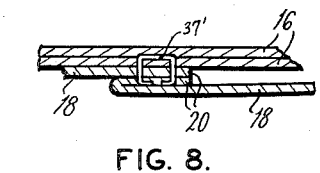
Fig. 8 is a fragmentary, sectional view taken through section 8—8 of Fig. 7.
Figure 9:
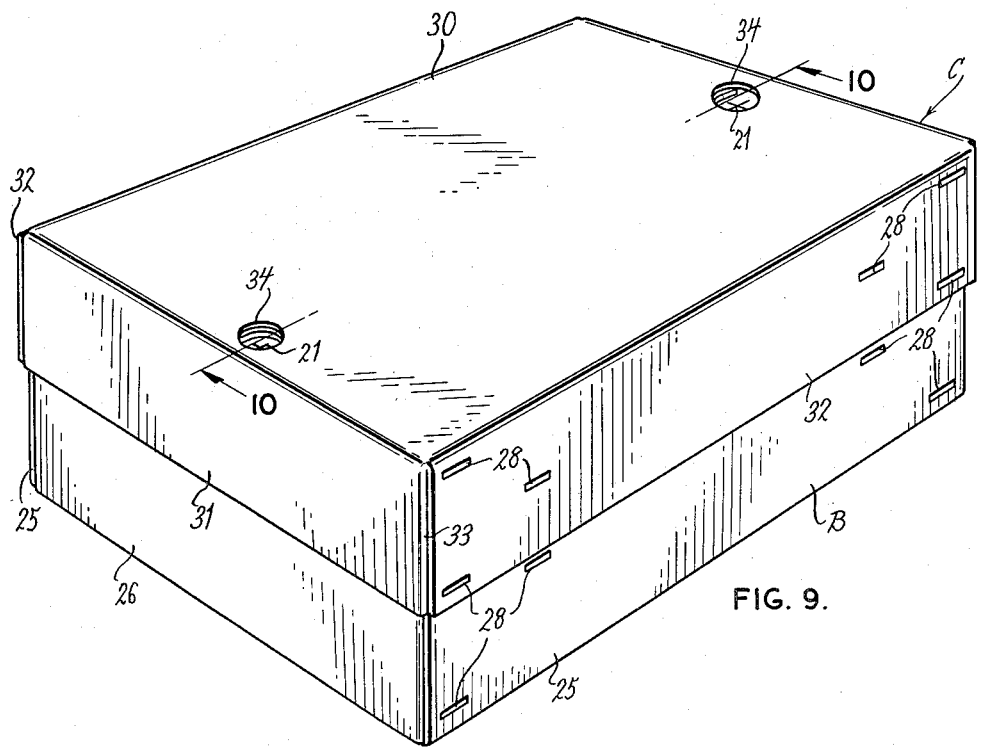
Fig. 9 is a perspective view of a container employing a preferred embodiment of this invention, illustrated with the cover member in position.
Figure 10:
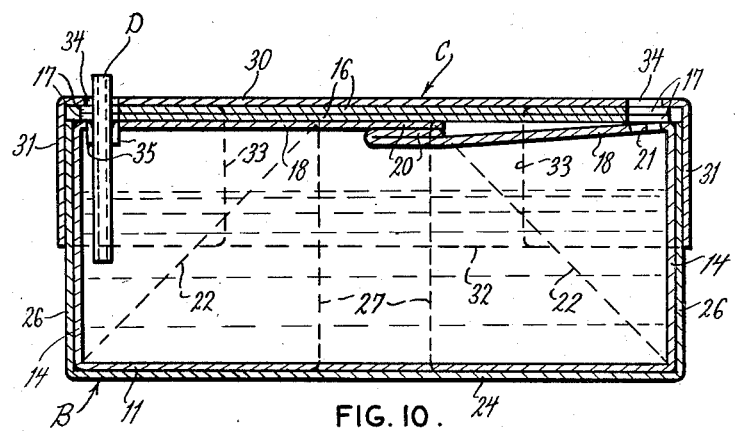
Fig. 10 is a view of the complete container taken through section 10—10 of Fig. 9. An aerating device is shown inserted in position.

A cover member C is then placed on the container. A preferred form of the cover member is illustrated in Figs. 9 and 10. It is provided with a top panel 30 with access openings 34 adjacent to the ends, two opposing end cover walls 31 and two opposing side cover walls 32. The end cover walls 31 are provided with end cover flaps 33 which are secured by stitches 28 to the inner face of the adjacent side cover walls 32. The cover member is telescoped over the top of the body member B and the waterproof insert A substantially as shown in Figs. 6 and 7. In this position, access openings 34 in the top panel 30 of the cover member C are in registering relation with the access notches 17 and the cross-slits 21. This relationship is most clearly shown in Fig. 10 of the drawings.

If it is desired to aerate the water within the container during transit, it is only necessary to insert an aerating device D such as a tube or hose through which may be forced fresh air. The aerating device D is inserted through the access opening 34, through the registering access notches 17 beneath, and through the cross slits 21 into the contents of the container as shown in Fig. 10, thus forcing of the aerating device D through the cross-slits inwardly. As the aerating device is removed, the material resiliency of the fibreboard tends to cause the flap portions 35 to spring upward into substantially cross-parallel relation with the end cover flap panel 18. Thus, it is apparent that the contents may be refreshed by aeration without removing the cover of the container. It is also apparent that there is provided a self-sealing, waterproof opening which will prevent loss of the fluid contents after the aerating device has been removed.

The rounded corners or fillets 36 provide an effective seal against leakage around the corners of the erected container. As the adjacent side cover flaps 16 and end cover flaps 18, are folded into position, the rounded corner portions 36 tend to seal the corner portions for added security.

While a preferred embodiment of this invention has been described, it is believed that this invention is susceptible of further modifications which will fall within the intended limits in the invention as defined by the claims next appearing.

What I claim as my invention is:

1. A receptacle for shipping live fish and other aquatic animals comprising an exterior container having upstanding side walls and a telescoping cover member firmly enclosing and reinforcing a one-piece, substantially waterproof, inner carton comprising a bottom, foldably connected side and end panels and corner webs foldably connected to the upstanding end margins of adjacent side and end panels, said corner webs being substantially bisected by a diagonal fold line and folded flatwise together intermediate said carton side panels and said container side walls, said end panels having top marginal flaps substantially equal in width thereto and provided with cross-slits therethrough, said top end flaps being folded horizontally inwardly with their free end edges in substantially abutting relationship, said side panels having foldably connected marginal top side flaps substantially equal in length thereto and folded inwardly in flatwise relation with the previously positioned top end flaps, the end margins of said side top flaps being provided with access notches in superimposed, registering relation with said cross-slits, said cover member having openings therethrough in registering relation with said access notches and said cross-slits through which, in the closed position of said receptacle, an aerating tube may be introduced into said inner carton and retracted therefrom.

2. A receptacle for shipping live fish and other aquatic animals comprising an exterior container having upstanding side and end walls and a telescoping cover member firmly enclosing and reinforcing a one-piece, substantially water-proof inner carton comprising a bottom, foldably connected side and end panels and corner webs foldably connected to the end margins of adjacent side and end panels, said corner webs being bisected by a diagonal fold line and positioned flatwise intermediate said side panels and said container side walls, said end panels having foldably connected top end marginal flaps at least equal in width thereto and provided with cross-slits therethrough and folded horizontally inwardly with their free side edges in normal abutting relationship with the upper margins of the adjacent side panels, said side panels having foldably connected marginal top side flaps substantially equal in length thereto and folded inwardly in flatwise relation with the upper face of the top end flaps, the free side margins of said side top flaps being in overlapping relation to each other and the end margins thereof being provided with access notches in superimposed, registering relation with said cross-slits, said telescoping cover member having openings therethrough in registering relation with said access notches and said cross-slits through which an aerating tube may be introduced into said inner carton and retracted therefrom in the closed condition of said receptacle.

3. A receptacle for shipping live fish and other aquatic animals comprising an exterior container having upstanding side and end walls and a telescoping cover member firmly enclosing and reinforcing a one-piece, substantially water-proof, inner carton, said carton comprising a bottom, foldably connected side and end panels and corner webs foldably connected to the end margins of adjacent side and end panels, said corner webs being substantially bisected by a diagonal fold line and folded flatwise intermediate the said side panels and said container side walls, said end panels having foldably connected top end marginal flaps equal in width thereto and provided with cross-slits adjacent the foldable connection with said adjacent end panel, each said top end flap being provided on its free end margin with a foldably connected center flap, said center flaps being secured together in flatwise contacting relation and positioned in horizontal, flatwise relation to the upper face of one of said top end flaps and the side edges of said top end flaps are in edgewise abutting relationship with the upper margin of the adjacent side panels, the side panels having foldably connected marginal top side flaps equal in length thereto folded horizontally inwardly into flatwise relation with the top end flaps, the free side margins of said top side flaps being in overlapping relation with each other, at least one of the top side flaps being secured to the center flaps, the end margins of the overlapping portion of said side top flaps being provided with access notches in superimposed horizontal relation with each other and with said cross-slits, said telescoping cover member having a top opening therethrough in registering relation with said access notches and said cross-slits, said aligned top cover opening, access notches and crossed slits providing means for introducing an aerating tube into said waterproof carton and withdrawing same in the closed condition of said receptacle.

4. The invention as set forth and claimed in claim 3 wherein in each corner between each top end flap and each corner web, a fillet portion is provided when the top end flaps and the side wall top flaps are in the closed position, said fillet portion extending snugly around the adjacent side edge of the side wall top flap thereby forming a substantially water-proof seal.

5. In an inexpensive expendable receptacle for shipping live fish and other aquatic animals comprising a one-piece waterproof inner carton formed of waterproof paperboard of high elastic resilience having a bottom, opposed side and end walls and a cover for containing the aquatic animals immersed in water, the carton being enclosed in a friction-fitting outer supporting and reinforcing paperboard container; a self sealing means formed exclusively of the material of the receptacle for introducing air periodically through a suitable removable tube into the inner carton as required to support the animal life, said means comprising crossed slits in the cover of the inner carton aligned with an opening in the cover of the enclosing container forming depressible, contiguous triangular shaped portions of the cover normally positioned in sealed relation to each other in the plane of the cover, said triangular portions being inwardly depressed within the elastic limit of the paperboard, out of the plane of the cover upon insertion of the aerating tube, and due to their resiliency the triangular portions, substantially resuming their normal sealed relation upon withdrawal of the aerating tube.

References Cited in the file of this patent

UNITED STATES PATENTS

| | | |
|---|---|---|
| 1,715,349 | Bodman | June 4, 1929 |
| 1,737,319 | McDonald | Nov. 26, 1929 |
| 1,965,769 | Kraft | July 10, 1934 |
| 2,192,006 | Cook | Feb. 27, 1940 |
| 2,316,607 | MacDonald | Apr. 13, 1943 |